(12) United States Patent
Takahashi et al.

(10) Patent No.: US 12,056,267 B2
(45) Date of Patent: Aug. 6, 2024

(54) ELECTRONIC DEVICE AND SHAPE CHANGING SYSTEM

(71) Applicant: SONY CORPORATION, Tokyo (JP)

(72) Inventors: Tomoko Takahashi, Tokyo (JP); Takamoto Tsuda, Tokyo (JP); Daisuke Iseki, Tokyo (JP)

(73) Assignee: SONY CORPORATION, Tokyo (JP)

(*) Notice: Subject to any disclaimer, the term of this patent is extended or adjusted under 35 U.S.C. 154(b) by 526 days.

(21) Appl. No.: 17/287,743

(22) PCT Filed: Sep. 18, 2019

(86) PCT No.: PCT/JP2019/036514
§ 371 (c)(1),
(2) Date: Apr. 22, 2021

(87) PCT Pub. No.: WO2020/090267
PCT Pub. Date: May 7, 2020

(65) Prior Publication Data
US 2021/0394373 A1    Dec. 23, 2021

(30) Foreign Application Priority Data

Nov. 2, 2018   (JP) .................................. 2018-207597

(51) Int. Cl.
*G06F 3/01* (2006.01)
*G02B 27/01* (2006.01)

(52) U.S. Cl.
CPC .............. *G06F 3/011* (2013.01); *G06F 3/016* (2013.01); *G02B 27/017* (2013.01); *G06F 3/01* (2013.01)

(58) Field of Classification Search
CPC .................................. G06F 3/011; G06F 3/016
See application file for complete search history.

(56) References Cited

U.S. PATENT DOCUMENTS

2009/0173223 A1   7/2009  Kudawara et al.
2015/0077364 A1*  3/2015  Parthasarathy ......... G06F 3/016
                                                      345/173
(Continued)

FOREIGN PATENT DOCUMENTS

CN       108279769 A    7/2018
EP         1985868 A1   10/2008
(Continued)

OTHER PUBLICATIONS

International Search Report and Written Opinion of PCT Application No. PCT/JP2019/036514, issued on Nov. 5, 2019, 10 pages of ISRWO.

*Primary Examiner* — Kevin M Nguyen
(74) *Attorney, Agent, or Firm* — CHIP LAW GROUP

(57) ABSTRACT

Provided are an electronic device and a shape changing system. The electronic device includes a plurality of deforming interfaces, each having a shape changing unit that causes a shape of the deforming interface to change, and, by controlling operations of the shape changing units to cause the shapes of the deforming interfaces to change, is capable of forming a vertex formed by causing a part of a surface formed including the plurality of deforming interfaces to protrude, in any desired position of the surface formed including the plurality of deforming interfaces. The shape changing system includes a shape change control unit that, by controlling operations of the shape changing units to cause the shapes of the deforming interfaces to change, is capable of forming a vertex, formed by causing a part of a surface formed including the plurality of deforming interfaces to protrude, in any desired position of the surface.

17 Claims, 37 Drawing Sheets

(56) References Cited

U.S. PATENT DOCUMENTS

| | | | |
|---|---|---|---|
| 2017/0289956 A1 | 10/2017 | Hirozawa et al. | |
| 2018/0157317 A1* | 6/2018 | Richter | G06F 3/011 |
| 2018/0190087 A1 | 7/2018 | Maalouf et al. | |
| 2019/0101986 A1* | 4/2019 | Khoshkava | G06F 3/016 |

FOREIGN PATENT DOCUMENTS

| | | |
|---|---|---|
| EP | 3346370 A1 | 7/2018 |
| JP | 0-979213 A | 3/1997 |
| JP | 2000-089895 A | 3/2000 |
| JP | 2011-519082 A | 6/2011 |
| JP | 2018-109999 A | 7/2018 |
| JP | 2018-152076 A | 9/2018 |
| KR | 10-2018-0080994 A | 7/2018 |
| WO | 2007/094031 A1 | 8/2007 |
| WO | 2016/052513 A1 | 4/2016 |

* cited by examiner

ELECTRONIC DEVICE AND SHAPE CHANGING SYSTEM

CROSS REFERENCE TO RELATED APPLICATIONS

This application is a U.S. National Phase of International Patent Application No. PCT/JP2019/036514 filed on Sep. 18, 2019, which claims priority benefit of Japanese Patent Application No. JP 2018-207597 filed in the Japan Patent Office on Nov. 2, 2018. Each of the above-referenced applications is hereby incorporated herein by reference in its entirety.

TECHNICAL FIELD

The technique according to the present disclosure (the present technique) relates, for example, to an electronic device that moves an object that comes into contact with the electronic device or the electronic device itself, and a shape changing system that includes the electronic device.

BACKGROUND ART

Some electronic devices include a deformation mechanism joined to a surface of a flexible member, as disclosed in PTL 1, for example. The flexible member can reconfigure properties of the surface. The deformation mechanism deforms the surface of the flexible member according to a pre-set pattern.

CITATION LIST

Patent Literature

[PTL 1]
Japanese Translation of PCT Application No. 2011-519082

SUMMARY

Technical Problem

However, with the technique disclosed in PTL 1, there is a problem in that it is difficult to move objects that contact the electronic device or the electronic device itself.

In view of the foregoing problem, an object of the present technique is to provide an electronic device that moves an object that comes into contact with the electronic device or the electronic device itself, and a shape changing system that includes the electronic device.

Solution to Problem

An electronic device according to one aspect of the present technique includes a plurality of deforming interfaces. The plurality of deforming interfaces each includes a shape changing unit that causes a shape of the deforming interface to change. Additionally, by controlling operations of the shape changing units to cause the shapes of the deforming interfaces to change, the electronic device can form a vertex, formed by causing a part of a surface formed including the plurality of deforming interfaces to protrude, in any desired position of the surface formed including the plurality of deforming interfaces.

A shape changing system according to one aspect of the present technique includes an electronic device having a plurality of deforming interfaces, and a shape change control unit. The plurality of deforming interfaces each includes a shape changing unit that causes a shape of the deforming interface to change. Additionally, by controlling operations of the shape changing units to cause the shapes of the deforming interfaces to change, the shape change control unit can form a vertex, formed by causing a part of a surface formed including the plurality of deforming interfaces to protrude, in any desired position of the surface formed including the plurality of deforming interfaces.

DESCRIPTION OF EMBODIMENTS

Embodiments of the present technique will be described hereinafter with reference to the drawings. In the descriptions of the drawings, identical or similar parts are given the same or similar reference signs, and redundant descriptions thereof are omitted. The drawings are schematic and may differ from the actual items. The following embodiments illustrate examples of devices, methods, and the like for embodying the technical spirit of the present technique, and the technical spirit of the present technique is not specific to the devices, methods, and the like described in the following embodiments. The technical spirit of the present technique can be modified in various ways within the technical scope set forth in the claims.

First Embodiment

Configuration of Electronic Device

Figure 1:
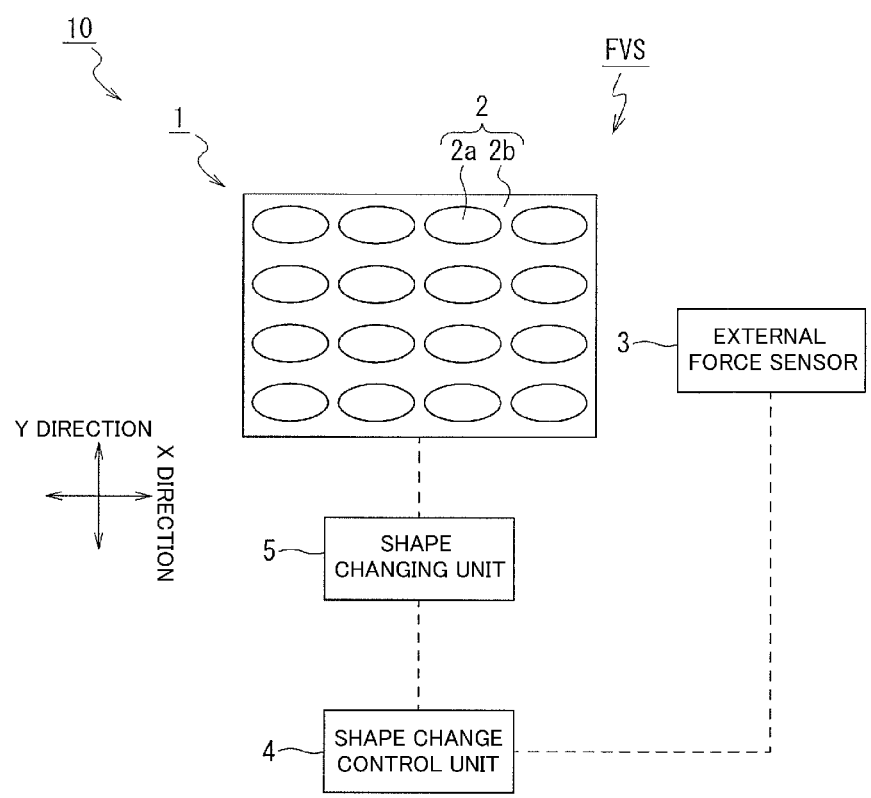
FIG. 1 is a block diagram illustrating the configuration of a shape changing system and an electronic device according to a first embodiment.

An electronic device 1 according to a first embodiment is incorporated into a transport device 10 as illustrated in FIG. 1.

The transport device 10 is a device that transports lightweight objects (objects to be transported), such as eggs, for example.

Figure 2:
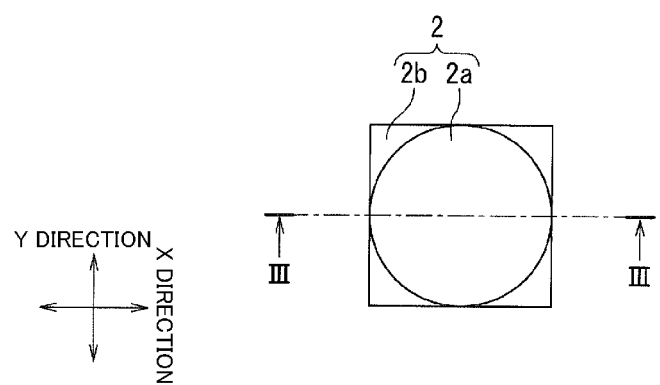
FIG. 2 is a plan view of a deforming interface.
Figure 3:
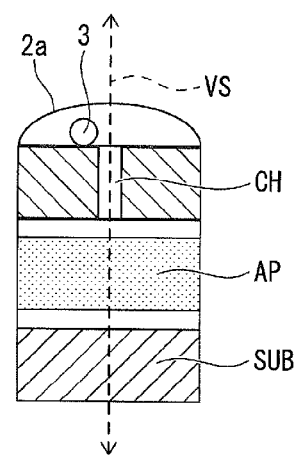
FIG. 3 is a cross-sectional view taken from a line III-III in FIG. 2.

The electronic device 1 also includes a plurality of deforming interfaces 2 disposed in a grid, as well as an external force sensor 3, as illustrated in FIGS. 1 to 3.

The electronic device 1, together with a shape change control unit 4, is included in a shape change system FVS. In other words, the shape change system FVS includes the electronic device 1 and the shape change control unit 4.

Each deforming interface 2 is formed using a sheet formed from an elastic material, e.g., light-transmissive silicone, so that the shape thereof changes by receiving an external force.

The first embodiment will describe a case where, viewed from a thickness direction of the sheet, the shape of the deforming interface 2 includes a deforming part 2a, which is a circular part, and a flat part 2b, which is a square part formed around the deforming part 2a.

Furthermore, the first embodiment will describe a configuration in which the sheet is formed by connecting the flat parts 2b of the deforming interfaces 2, as illustrated in FIG. 1.

The sheet is arranged in a pre-set plane.

The "pre-set plane" is, for example, a surface on which the sheet is disposed, such as a wall surface, a top surface of a desk, or the like.

The deforming interface 2 includes a shape changing unit 5 that causes a change in the state of only the deforming part 2a of the deforming interface 2.

The shape changing unit 5 is formed including, for example, an air pump, and causes the deforming part 2a to change shape using a fluid (a gas).

The external force sensor 3 is formed using, for example, a mechanical pressure sensor.

The pressure sensor included in the external force sensor 3 detects an external force acting on the deforming interface 2. The external force detected by the pressure sensor is output to the shape change control unit 4.

In other words, the external force sensor 3 formed using a mechanical pressure sensor directly detects an external force acting on the deforming interface 2.

The external force sensor 3 formed using a mechanical pressure sensor can detect coordinates of an external force along a Z direction, which is orthogonal to an X direction and a Y direction indicated in FIG. 2.

As illustrated in FIG. 3, the external force sensor 3 is disposed, for example, within the deforming part 2a. Note that in FIG. 3, the deforming part 2a is illustrated as being deformed by expanding from a flat shape to a dome shape. The shape into which the deforming part 2a expands from the flat shape and deforms into includes a dome shape, a cone shape, and the like.

Additionally, FIG. 3 illustrates an air pump AP and as well as a channel CH that allows the air pump AP and an inner surface of the deforming part 2a (a surface on the lower side, in FIG. 3) to communicate. Additionally, FIG. 3 illustrates a substrate SUB that supports the air pump AP, the deforming interface 2, and the like. Note that the air pump AP forms the state changing unit 5, which changes the state of the deforming part 2a by supplying air to the deforming part 2a.

The external force sensor 3 formed using a mechanical pressure sensor can detect an external force along a deformation axis VS indicated in FIG. 3 as a binary value of ON or OFF.

The deformation axis VS is a single axis following the direction in which the shape of the deforming interface 2 (the deforming part 2a) is caused to deform. The first embodiment will describe a case in which an axial direction of the deformation axis VS is parallel to a thickness direction of the flat part 2b (the thickness direction of the sheet).

An example of the shape in which the deforming part 2a deforms is illustrated in FIGS. 4A, 4B, 4C, and 4D.

Figure 4A:
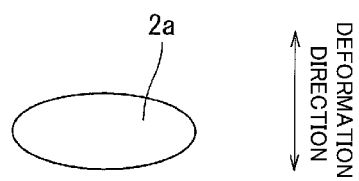
FIG. 4A is a diagram illustrating deformation of the deforming interface.
Figure 4B:
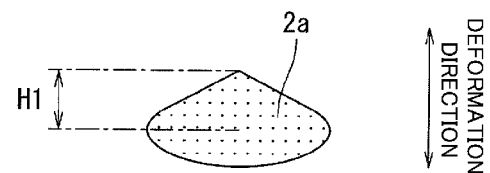
FIG. 4B is a diagram illustrating deformation of the deforming interface.
Figure 4C:
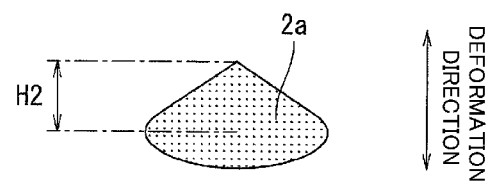
FIG. 4C is a diagram illustrating deformation of the deforming interface.
Figure 4D:
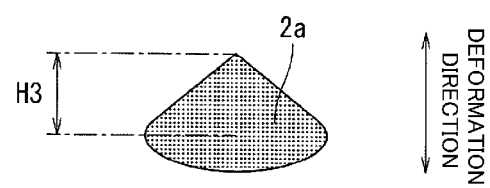
FIG. 4D is a diagram illustrating deformation of the deforming interface.

When air is supplied from the air pump AP to the interior of the flat-shaped deforming part 2a through the channel CH illustrated in FIG. 4A, the deforming part 2a expands and deforms into a cone shape having a height H1, as illustrated in FIG. 4B. When air is further supplied to the interior of the deforming part 2a from the state illustrated in FIG. 4B, the amount of deformation of the deforming part 2a increases, and the height of the deforming part 2a becomes H2, which is higher than H1, as illustrated in FIG. 4C. When air is further supplied to the interior of the deforming part 2a from the state illustrated in FIG. 4C, the amount of deformation of the deforming part 2a increases, and the height of the deforming part 2a becomes H3, which is higher than H2, as illustrated in FIG. 4D. When the supply of air to the deforming part 2a is stopped, and a valve of the air pump AP, which is located outside the drawing, is opened, a restorative force arises in the deforming part 2a, and the deformation amount of the deforming part 2a decreases. The height of the deforming part 2a decreases as a result (H3→H2→H1→0).

As illustrated in FIG. 4A, when the deforming part 2a is in the flat shape (when the height is 0), the sheet that forms the deforming interface 2 becomes a flat surface, and the deforming interface 2 is therefore unobtrusive to a user of an operated device CM. Note that the direction in which the deforming part 2a deforms in FIGS. 4A, 4B, 4C, and 4D are indicated as a "deformation direction" with a bidirectional arrow.

The shape change control unit 4 is formed including a CPU and memory, for example, and controls operations of the shape changing unit 5 in accordance with the external force detected by the external force sensor 3 and a pre-set pattern. Specifically, when the external force sensor 3 detects an external force, the deforming interface 2 in which the external force sensor 3 that detected the external force is disposed deforms along the deformation axis VS. This changes the height of the deforming interface 2 (the deforming part 2a).

The pre-set pattern is a pattern that forms vertices in such a manner that the positions of vertices, formed by causing parts of the surface formed including the plurality of deforming interfaces to protrude, are continuously moving. This pattern starts, for example, at the deforming interface 2 in which the external force sensor 3 that first detected the external force is disposed.

In the first embodiment, as one example, the pre-set pattern is a pattern that causes the positions of the vertices to move continuously, starting from the deforming interfaces 2 which form a single row in the Y direction including the external force sensor 3 that first detected the external force. In this case, the direction in which the positions vertices are caused to move continuously (a direction parallel to the X direction) is, for example, a direction that takes a side on which a member that collects an object to be transported is disposed as a downstream side.

As described above, by controlling the operations of the shape changing unit 5 to cause the shapes of the deforming interfaces 2 to change, the shape change control unit 4 can form vertices, formed by causing parts of the surface formed including the plurality of deforming interfaces 2 to protrude, in any desired position of the surface.

<Operations of Transport Device>

Figure 5:
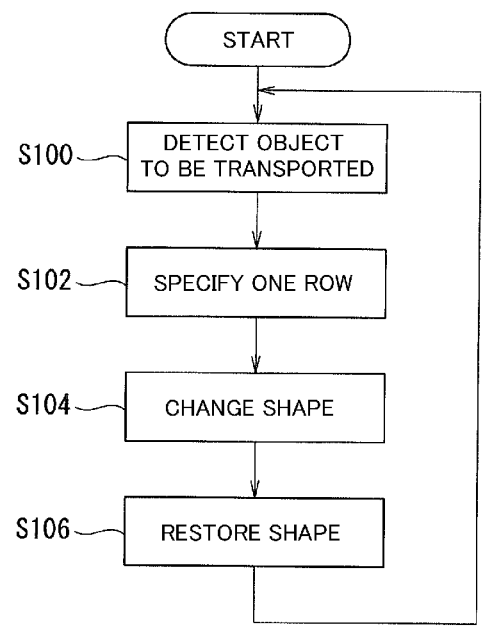
FIG. 5 is a flowchart illustrating operations performed by a transport device according to the first embodiment.
Figure 6:
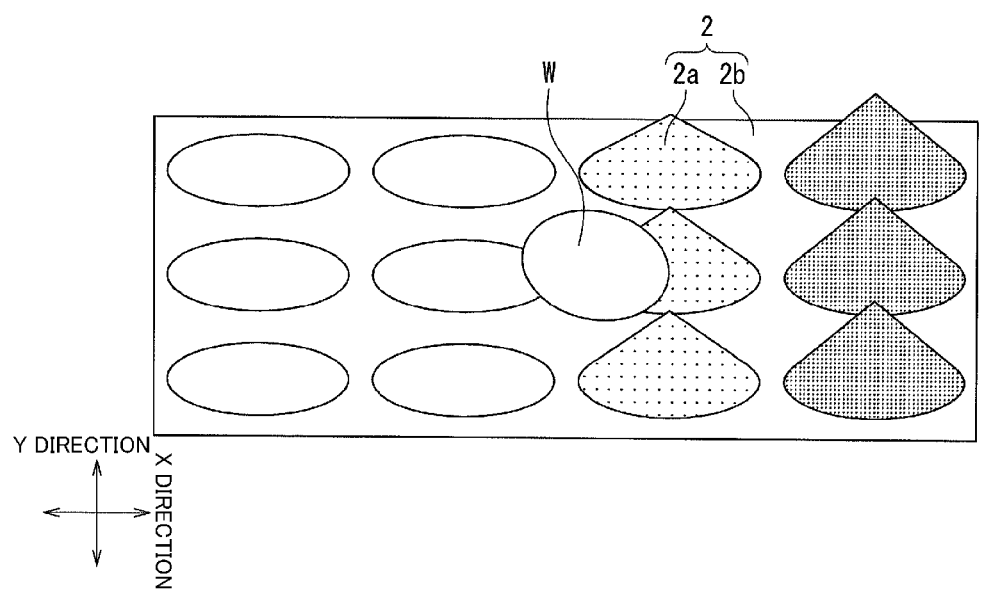
FIG. 6 is a diagram illustrating operations performed by the transport device according to the first embodiment.
Figure 7:
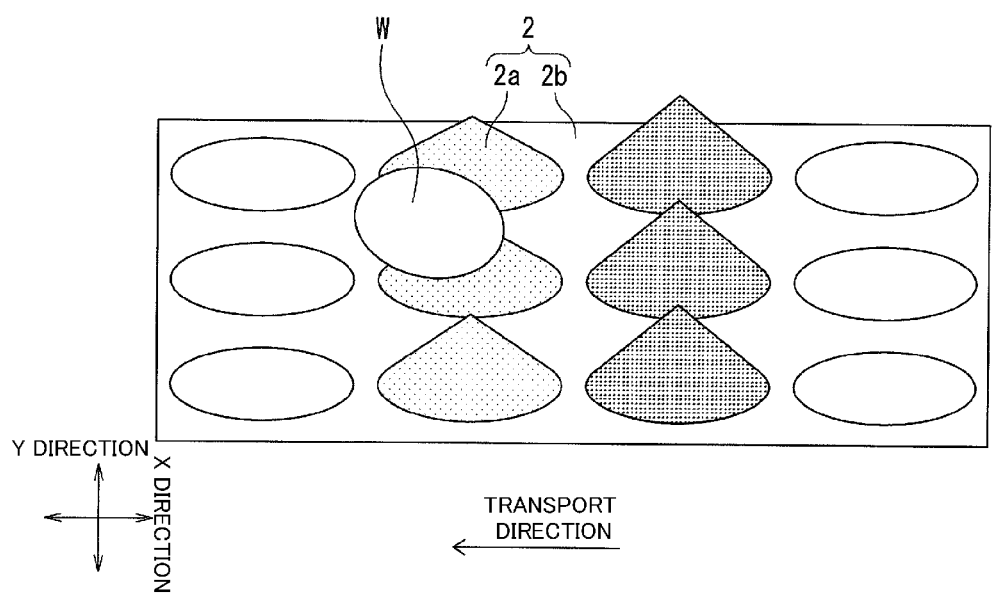
FIG. 7 is a diagram illustrating operations performed by the transport device according to the first embodiment.

An example of operations performed by the transport device 10 according to the first embodiment will be described based on FIGS. 5 to 7, with continued reference to FIGS. 1, 2, 3, 4A, 4B, 4C, and 4D. Note that the operations described below start from a state in which all of the deforming interfaces 2 (the deforming parts 2a) are in the flat shape.

In step S100, by detecting an external force acting on the deforming interfaces 2, the external force sensor 3 detects the deforming interface 2 which, among the plurality of deforming interfaces 2, is receiving the external force from an object to be transported.

In step S102, the plurality of deforming interfaces 2 that form a single row including the deforming interface 2 detected in step S100 are specified.

In step S104, the shape change control unit 4 changes the shape, and increases the height, of all the deforming interfaces 2 forming the single row specified in step S102. This increases the heights of the plurality of deforming interfaces 2 that form the single row including the deforming interface 2 receiving the external force from an object to be transported W, as illustrated in FIG. 6. When the heights of the plurality of deforming interfaces 2 that form the single row are increased, the object to be transported W moves toward the deforming interfaces 2 that are lower in height, as illustrated in FIG. 7. Accordingly, the object to be transported W can be transported in a transport direction.

In step S106, upon detecting that the external force which had been acting on the deforming interfaces 2 which were increased in height has disappeared, the shape change control unit 4 restores the shape of the deforming interfaces 2 from which the external force has disappeared to the flat shape. The processing then proceeds to step S100.

The configuration of the first embodiment makes it possible to provide the electronic device 1, which can cause an object that comes into contact with the electronic device (the object to be transported W) to move, and the transport device 10, which is capable of causing the object that comes into contact with the electronic device 1 to move.

According to the configuration of the first embodiment, causing the shape of the deforming interface 2, which is formed from an elastic material, to change using a fluid causes the object to be transported W to move. This makes it possible to suppress damage to the object to be transported W even when the object to be transported W is an object that is difficult to handle and easily damaged, such as an egg, a component made of glass, or the like.

According to the configuration of the first embodiment, the object to be transported W can be transported to an area furthest downstream no matter where the object to be transported W is placed on the sheet formed by connecting a plurality of the flat parts 2b, as long as the object to be transported W is placed in a position upstream from the area furthest downstream in the direction in which the positions of the vertices are continually moved.

Variations on First Embodiment

In the first embodiment, the configuration of the shape changing unit 5 is a configuration that uses a gas to change the state of the deforming parts 2a, but the configuration is not limited thereto, and the state of the deforming parts 2a may be changed using a liquid instead.

In the first embodiment, the external force sensor 3 is formed using a mechanical pressure sensor, but the configuration is not limited thereto, and the external force sensor 3 may instead be formed using an atmospheric pressure sensor, for example.

Like the external force sensor 3 formed using a mechanical pressure sensor, the external force sensor 3 formed using an atmospheric pressure sensor can detect coordinates of an external force along the Z direction, which is orthogonal to the X direction and the Y direction.

The external force sensor 3 formed using an atmospheric pressure sensor can therefore detect the strength of the external force acting on the deforming interface 2.

Figure 8:
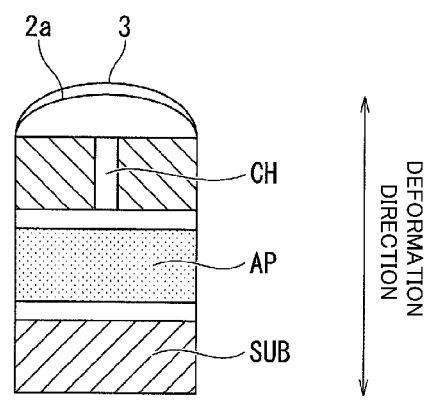
FIG. 8 is a diagram illustrating a variation on the first embodiment.

In the first embodiment, the external force sensor 3 is formed using a mechanical pressure sensor, but the configuration is not limited thereto, and the external force sensor 3 may instead be formed using a panel-type sensor disposed outside the deforming part 2a as illustrated in FIG. 8, for example. In this case, an electrostatic panel, a pressure-sensitive panel, or the like can be used as the panel-type sensor, for example.

In other words, the external force sensor 3 formed using an electrostatic panel indirectly detects an external force acting on the deforming interface 2. Additionally, the external force sensor 3 formed using a pressure-sensitive panel directly detects an external force acting on the deforming interface 2. The external force sensor 3 formed using a panel-type sensor can detect coordinates of an external force along the X direction, the Y direction, and so on. Furthermore, the external force sensor 3 formed using an electrostatic panel can detect an external force along the Z direction as a binary value of ON or OFF. On the other hand, the external force sensor 3 formed using a pressure-sensitive panel can detect coordinates of an external force along the Z direction at a higher resolution than an atmospheric pressure sensor.

Accordingly, the external force sensor 3 formed using an electrostatic panel can detect the strength of an external force acting on the deforming interface 2 two-dimensionally along the X direction and the Y direction, and can also detect an external force along the Z direction as a binary value of ON or OFF.

Additionally, the external force sensor 3 formed using a pressure-sensitive panel can detect the strength of an external force acting on the deforming interface 2 three-dimensionally along the X direction, the Y direction, and the Z direction.

Figure 9:
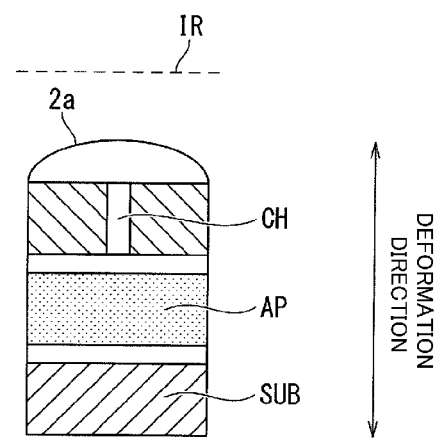
FIG. 9 is a diagram illustrating a variation on the first embodiment.

In the first embodiment, the external force sensor 3 is formed using a mechanical pressure sensor, but the configuration is not limited thereto, and the external force sensor 3 may instead be formed using an infrared sensor (not shown) disposed outside the deforming part 2a as illustrated in FIG. 9, for example. Note that infrared light output by the infrared sensor is indicated as a broken line with reference sign IR in FIG. 9.

In other words, the external force sensor 3 formed using an infrared sensor indirectly detects an external force acting on the deforming interface 2. The external force sensor 3 formed using an infrared sensor can detect coordinates of an external force along the X direction, the Y direction, and the Z direction. In addition to this, the external force sensor 3 formed using an infrared sensor can detect coordinates where an external force may be applied along the Z direction, at the point in time when a user has approached the deforming interface 2.

Specifically, the external force sensor 3 formed using an infrared sensor estimates the strength of an external force acting on the deforming interface 2 on the basis of a movement speed of an object moving toward the deforming interface 2 when the object passes through the infrared light IR. Through this, for example, the faster the movement speed is when the object moves through the infrared light IR, the stronger the external force that will act on the deforming interface 2 is estimated to be, and the strength of the external force acting on the deforming interface 2 is detected. Additionally, for example, if the movement speed of the object is almost "0" when the object passes through the infrared light IR, it is estimated that the object will not contact the deforming interface 2, and that no external force will act on the deforming interface 2. Accordingly, the external force sensor 3 formed using an infrared sensor can detect the strength of an external force acting on the deforming interface 2 three-dimensionally along the X direction, the Y direction, and the Z direction. In addition to this, the external force sensor 3 formed using an infrared sensor can estimate whether or not an external force will act on the deforming interface 2 before the external force acts on the deforming interface 2.

Figure 10:
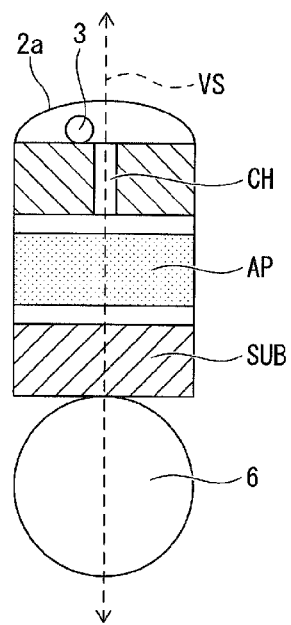
FIG. 10 is a diagram illustrating a variation on the first embodiment.

In the first embodiment, the configuration is such that the axial direction of the deformation axis VS is parallel to the thickness direction of the flat part 2b, but the configuration is not limited thereto. In other words, the configuration may include a tilt changing unit 6 that changes a tilt of the deformation axis VS, as illustrated in FIG. 10, for example.

The tilt changing unit 6 is formed using, for example, a universal joint, an actuator that causes the universal joint to operate, and so on.

In this case, the shape change control unit 4 controls operations of the shape changing unit 5 and the tilt changing unit 6 in accordance with the external force detected by the external force sensor 3 and a pre-set pattern.

In other words, when the external force sensor 3 detects an external force, the deformation axis VS set in the deforming interface 2 in which the external force sensor 3 that detected the external force is disposed is caused to tilt. This changes the direction in which the height of the deforming interface 2 (the deforming part 2a) changes.

In the first embodiment, the external force sensor 3 is formed using only a mechanical pressure sensor alone, but the configuration is not limited thereto, and the external force sensor 3 may instead be formed using a plurality of sensors, such as a pressure sensor and an atmospheric pressure sensor, for example. In other words, the external force sensor 3 may be formed using various types of sensors, such as a pressure sensor or an infrared sensor, alone, or may be formed using a sensor unit including two or more of various types of sensors. Additionally, the external force sensor 3 may be configured to directly detect an external force acting on the deforming interface 2, configured to indirectly detect an external force acting on the deforming interface 2, or configured to both directly and indirectly detect an external force acting on the deforming interface 2. Additionally, the external force sensor 3 may be configured to quantitatively detect a magnitude, direction, and the like of an external force acting on the deforming interface 2, or configured to detect only whether or not an external force is acting on the deforming interface 2.

Second Embodiment

The electronic device 1 and the transport device 10 according to a second embodiment also have the same configurations as those illustrated in FIGS. 1, 2, 3, 4A, 4B, 4C, and 4D, and therefore have the same configurations as the electronic device 1 and the transport device 10 according to the first embodiment. However, in the shape change system FVS according to the second embodiment, the configuration of the shape change control unit 4 is different from that in the first embodiment.

The shape change control unit 4 controls operations of the shape changing unit 5 in accordance with the external force detected by the external force sensor 3 and a pre-set pattern.

Specifically, when the external force sensor 3 detects an external force, the deforming interface 2 in which the external force sensor 3 that detected the external force is disposed deforms along the deformation axis VS. This changes the height of the deforming interface 2 (the deforming part 2a).

The pre-set pattern is, for example, a pattern that forms vertices in such a manner that the positions of vertices, formed by causing parts of the surface to protrude, are continuously moving, starting with the deforming interface 2 in which the external force sensor 3 that first detected the external force is disposed.

In the second embodiment, as one example, the pre-set pattern is a pattern that causes the positions of the vertices to move continuously, starting from the one deforming interface 2 including the external force sensor 3 that first detected the external force. In this case, the direction in which the positions of the vertices are caused to move is, for example, a direction in which a given position to which the object to be transported is ultimately to be moved is located furthest downstream.

Figure 11:
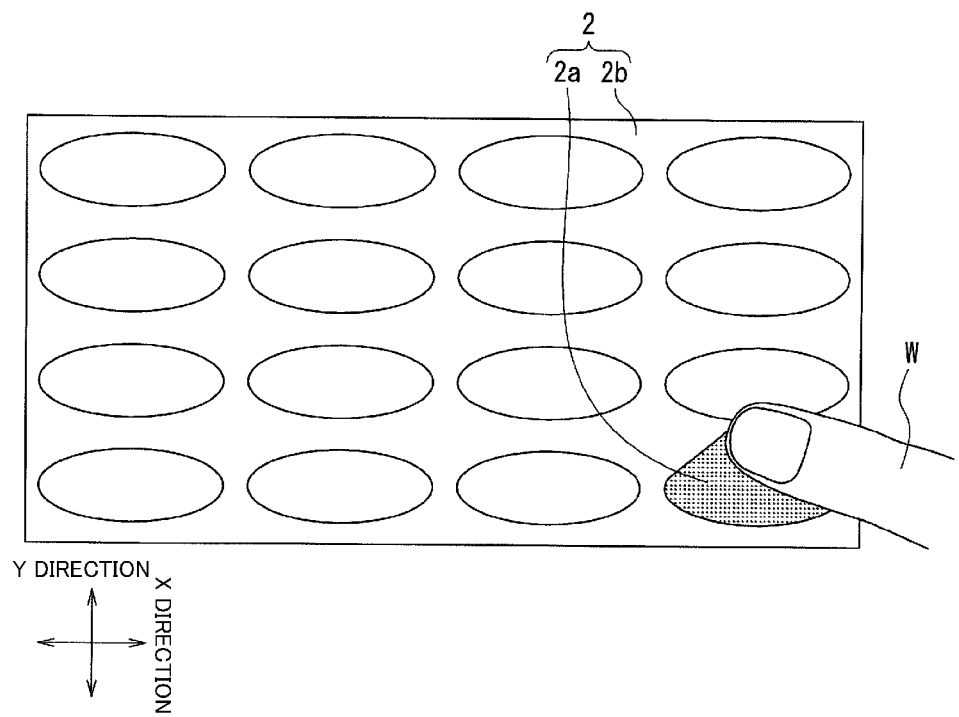
FIG. 11 is a diagram illustrating operations performed by a transport device according to a second embodiment.

In the operations of the electronic device 1 and the transport device 10 according to the second embodiment, the shape change control unit 4 changes the shape and increases the height of the deforming interface 2 that is receiving the external force from the object to be transported. This increases the heights of the deforming interface 2 receiving the external force from an object to be transported W, as illustrated in FIG. 11. Note that the second embodiment describes a case where the object to be transported W is a person's finger (index finger), as illustrated in the drawings.

Figure 12:
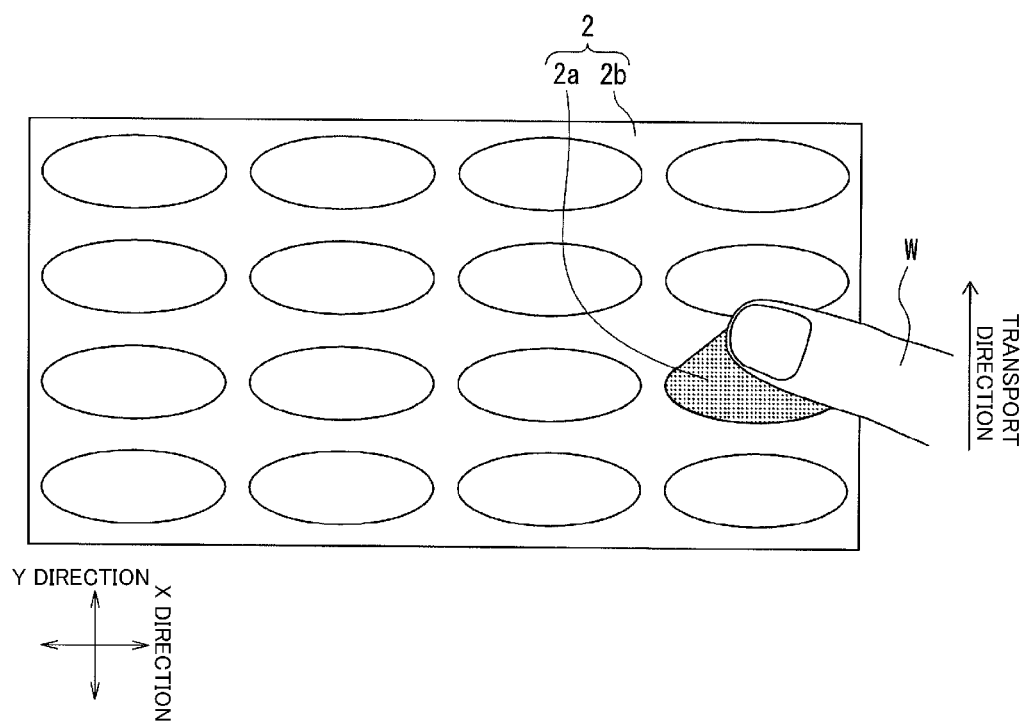
FIG. 12 is a diagram illustrating operations performed by the transport device according to the second embodiment.

When the height of the deforming interface 2 that is receiving the external force from the object to be transported W is increased, the object to be transported W moves toward the deforming interfaces 2 that are lower in height, as illustrated in FIG. 12. Accordingly, the object to be transported W can be transported in a transport direction.

According to the configuration of the second embodiment, the object to be transported W that applies an external force to a single deforming interface 2 can be caused to move to a single deforming interface 2 disposed in a given position to which the object to be transported W is ultimately to be moved.

Third Embodiment

Figure 13:
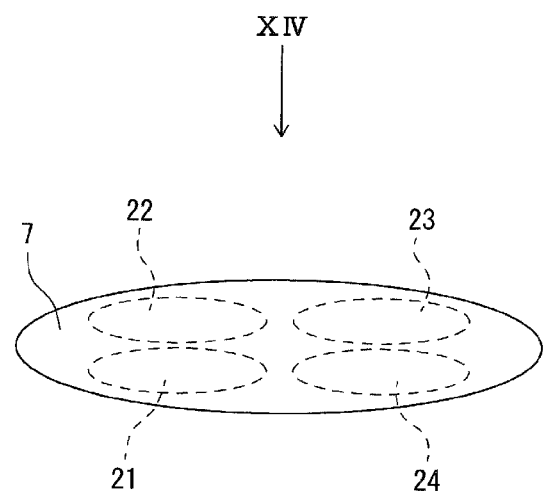
FIG. 13 is a diagram illustrating a plurality of deforming interfaces and one case part provided in an electronic device according to a third embodiment.

The electronic device 1 according to a third embodiment has the same configuration as in the first embodiment, aside from the plurality of deforming interfaces 2 being housed within a single case part 7, as illustrated in FIG. 13. Additionally, the shape change system FVS according to the third embodiment as the same configuration as in the first embodiment, aside from the configuration of the shape change control unit 4. Descriptions of parts identical to those in the first embodiment will be omitted from the following descriptions. As one example, the third embodiment will describe a configuration in which four deforming interfaces 21 to 24 are housed within the single case part 7.

The case part 7 is formed using a sheet formed from an elastic material, e.g., light-transmissive silicone, so that the shape thereof changes by receiving an external force.

The third embodiment will describe a configuration in which the shape of the case part 7 is circular.

Figure 14:
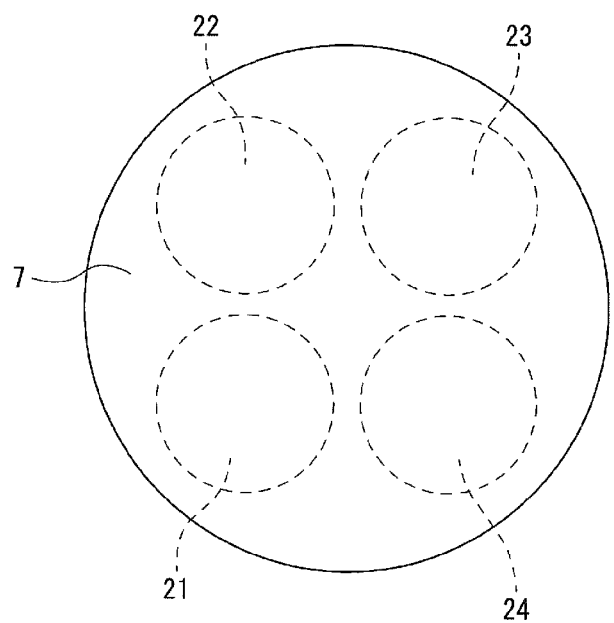
FIG. 14 is a diagram illustrating a view from the arrow XIV in FIG. 13.

As illustrated in FIG. 14, the four deforming interfaces 21 to 24 are disposed in positions so that centerpoints of the four deforming interfaces 21 to 24 form the vertices of respective squares, as viewed from the thickness direction of the sheet that forms the case part 7.

Additionally, the four deforming interfaces 21 to 24 are disposed so that the centerpoints thereof are located at the same distance from a centerpoint of the case part 7, as viewed from the thickness direction of the sheet that forms the case part 7.

The shape change control unit 4 controls operations of the shape changing unit 5 in accordance with the external force detected by the external force sensor 3 and a pre-set pattern.

Specifically, when the external force sensor 3 detects an external force, the deforming interface 2 in which the external force sensor 3 that detected the external force is disposed deforms along the deformation axis VS. This changes the height of the deforming interface 2 (the deforming part 2a).

Figure 15A:
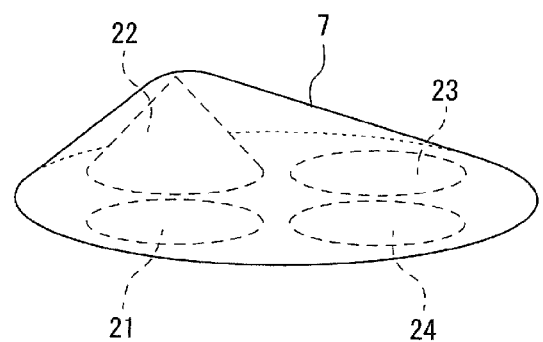
FIG. 15A is a diagram illustrating a pattern in which the shape of the deforming interface is changed.
Figure 15B:
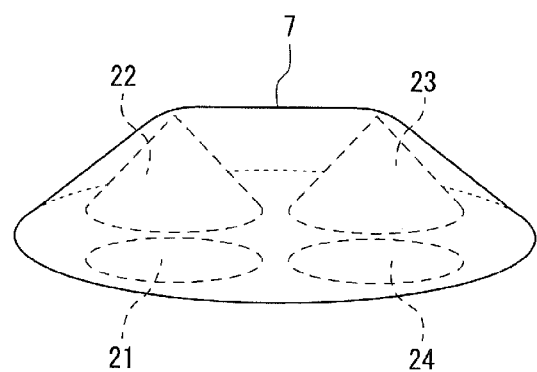
FIG. 15B is a diagram illustrating a pattern in which the shape of the deforming interface is changed.
Figure 15C:
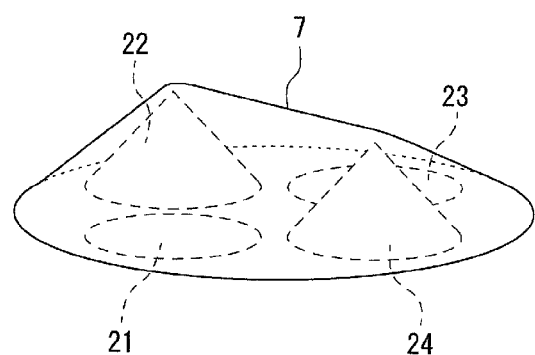
FIG. 15C is a diagram illustrating a pattern in which the shape of the deforming interface is changed.

The pre-set pattern includes, for example, a pattern in which the height of only one of the deforming interfaces 2 is changed, as illustrated in FIG. 15A, and a pattern in which the heights of two of the deforming interfaces 2 are changed, as illustrated in FIGS. 15B and 15C.

Figure 15D:
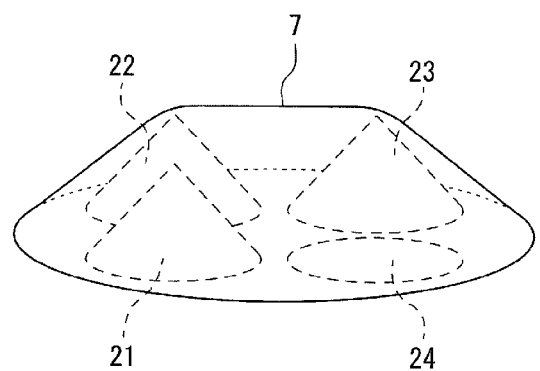
FIG. 15D is a diagram illustrating a pattern in which the shape of the deforming interface is changed.
Figure 15E:
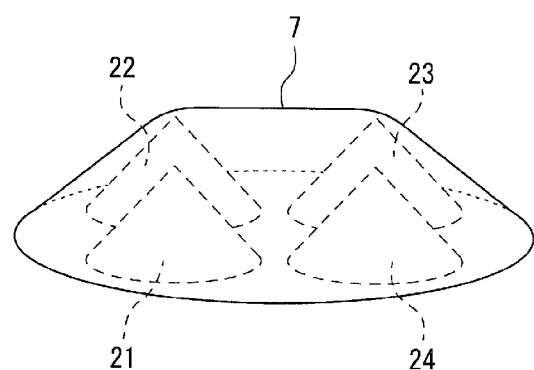
FIG. 15E is a diagram illustrating a pattern in which the shape of the deforming interface is changed.

Also included are a pattern in which the heights of three of the deforming interfaces 2 are changed, as illustrated in FIG. 15D, and a pattern in which the heights of all (four) of the deforming interfaces 2 are changed, as illustrated in FIG. 15E.

Figure 16A:
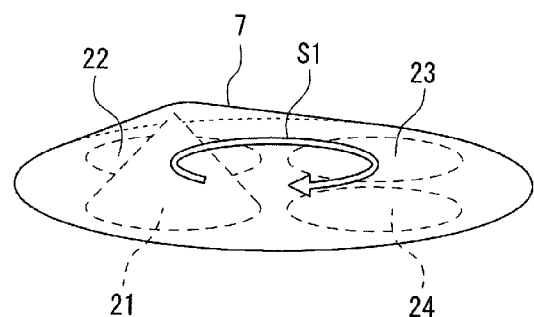
FIG. 16A is a diagram illustrating a pattern in which the shape of the deforming interface is changed.

Additionally, the pre-set pattern includes a pattern in which, for example, single ones of the deforming interfaces 2 are caused to deform in order along a circumferential direction of the case part 7, as illustrated in FIG. 16A. In FIG. 16A, the order in which the deforming interfaces 2 are caused to deform along the circumferential direction of the case part 7 is indicated by an arrow S1. In other words, with the pattern illustrated in FIG. 16A, after the shape of one of the deforming interfaces 2 is changed, the shape of the one deforming interface 2 that was changed is restored. Then, a pattern is repeated in which the shape of the next deforming interface 2 in the clockwise direction in the drawing is changed, after which the shape of the deforming interface 2 that was changed is restored.

Figure 16B:
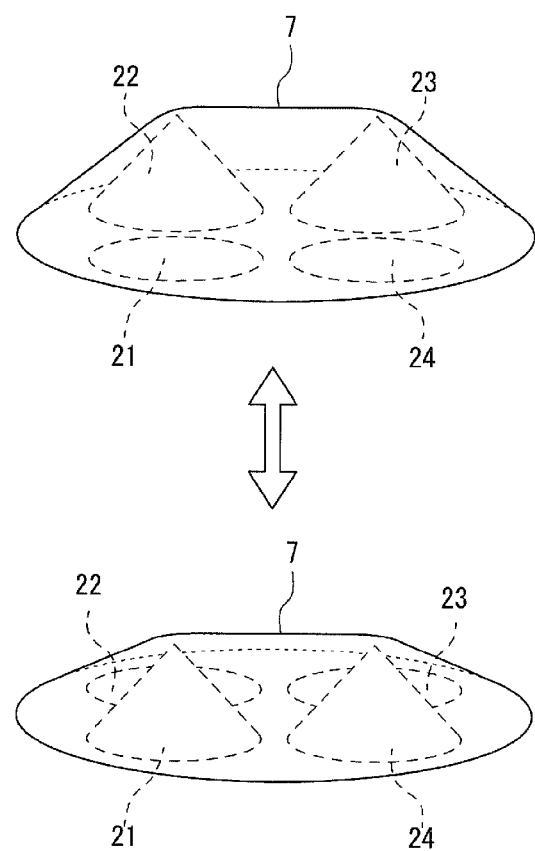
FIG. 16B is a diagram illustrating a pattern in which the shape of the deforming interface is changed.

Also included is a pattern in which pairs constituted by two adjacent deforming interfaces 2 are caused to deform in an alternating manner, as illustrated in FIG. 16B. In other words, with the pattern illustrated in FIG. 16B, pairs of adjacent deforming interfaces 2 are caused to change shape, alternating in an up-down direction.

Figure 16C:
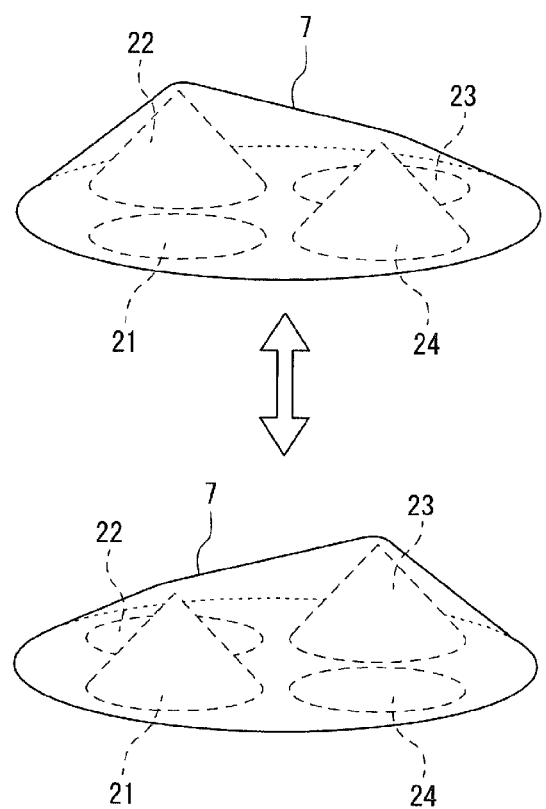
FIG. 16C is a diagram illustrating a pattern in which the shape of the deforming interface is changed.

Further included is a pattern in which pairs constituted by two adjacent deforming interfaces 2 on opposite sides of the centerpoint of the case part 7 are caused to deform in an alternating manner, as illustrated in FIG. 16C. In other words, with the pattern illustrated in FIG. 16C, pairs of deforming interfaces 2 arranged diagonally are caused to change shape, alternating with respect to the centerpoint of the case part 7.

Figure 17:
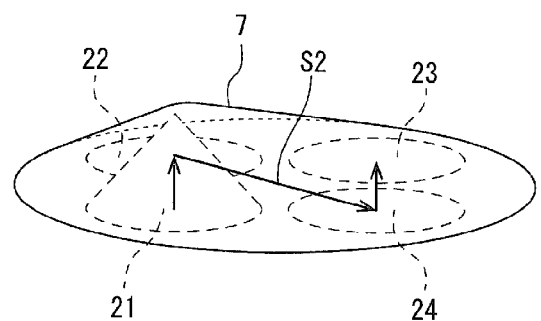
FIG. 17 is a diagram illustrating a pattern in which the shape of the deforming interface is changed.

Additionally, the pre-set pattern includes a pattern in which, for example, single ones of the deforming interfaces 2 are caused to deform in order along Z-shaped (zig-zag) straight lines, as illustrated in FIG. 17. Note that in FIG. 17, the order in which the deforming interfaces 2 are caused to deform along the Z-shaped straight lines is indicated by an arrow S2. In other words, with the pattern illustrated in FIG. 17, after the shape of one of the deforming interfaces 2 is changed, the shape of the one deforming interface 2 that was changed is restored. Then, a pattern is repeated in which the shape of the next deforming interface 2 in the Z shape in the drawing is changed, after which the shape of the deforming interface 2 that was changed is restored.

Figure 18:
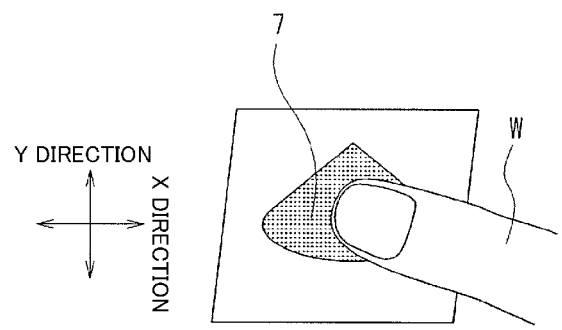
FIG. 18 is a diagram illustrating operations performed by a transport device according to the third embodiment.

According to the configuration of the third embodiment, as illustrated in FIG. 18, the object to be transported W that applies an external force to the single case part 7 which houses the plurality of deforming interfaces 2 can be caused to move in the X direction and the Y direction indicated in the drawing, for example.

Fourth Embodiment

<Configuration of Electronic Device>

Figure 19:
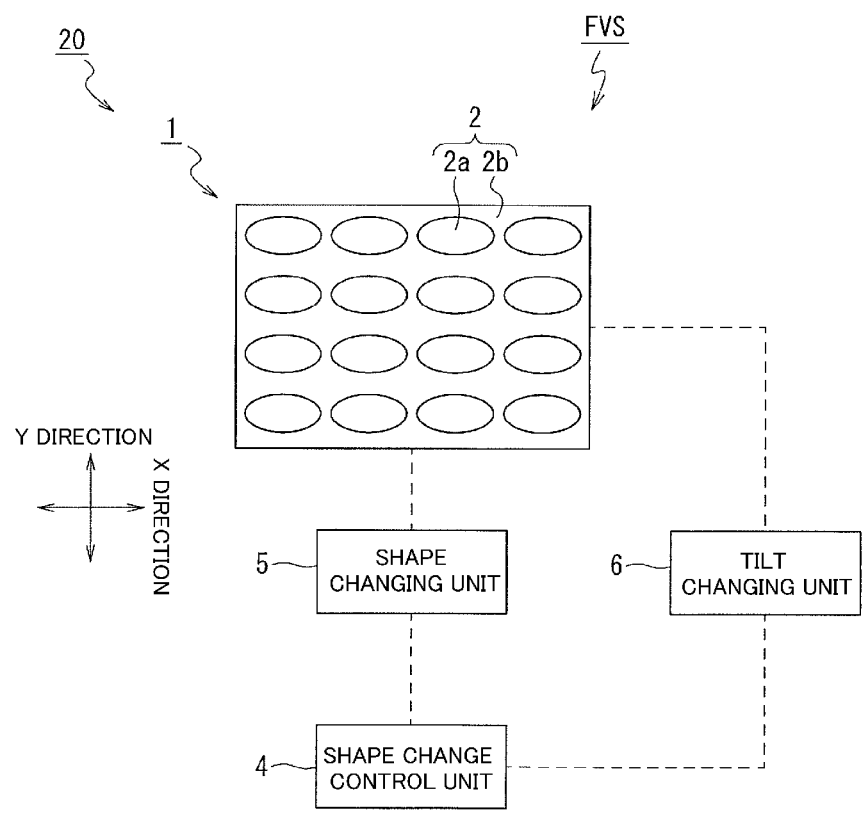
FIG. 19 is a diagram illustrating the configuration of a shape changing system, an electronic device, and a mobile device according to a fourth embodiment.

The electronic device 1 according to a fourth embodiment is incorporated into a mobile device 20 as illustrated in FIG. 19. Descriptions of parts identical to those in the first embodiment will be omitted from the following descriptions. The mobile device 20 is a device that moves the electronic device 1 itself. As illustrated in FIG. 19, the electronic device 1 includes the plurality of deforming interfaces 2 and the shape change control unit 4.

A sheet formed by connecting the flat parts 2b of the deforming interfaces 2 is disposed on a pre-set plane.

The "pre-set plane" is, for example, a surface on which the sheet is disposed, and is a surface of the mobile device 20 opposing a surface to be moved on (a floor surface, a top surface of a desk, or the like).

Accordingly, the deforming interfaces 2 contact the surface to be moved on.

The deforming interface 2 includes the shape changing unit 5 that causes a change in the state of only the deforming part 2a of the deforming interface 2, and the tilt changing unit 6 that changes the tilt of the deformation axis VS. The shape changing unit 5 is formed including, for example, an air pump, and causes the deforming part 2a to change shape using a fluid (a gas). The tilt changing unit 6 is formed using, for example, a universal joint, an actuator that causes the universal joint to operate, and so on.

The shape change control unit 4 controls operations of the shape changing unit 5 and the tilt changing unit 6 in accordance with a pre-set pattern.

The pre-set pattern is, for example, a pattern that moves the mobile device 20 in a desired direction through a combination of a direction in which the heights of the deforming interfaces 2 are changed by the shape changing unit 5 and the tilt of the deformation axis VS by the tilt changing unit 6, based on a movement direction of the mobile device 20.

Figure 20:
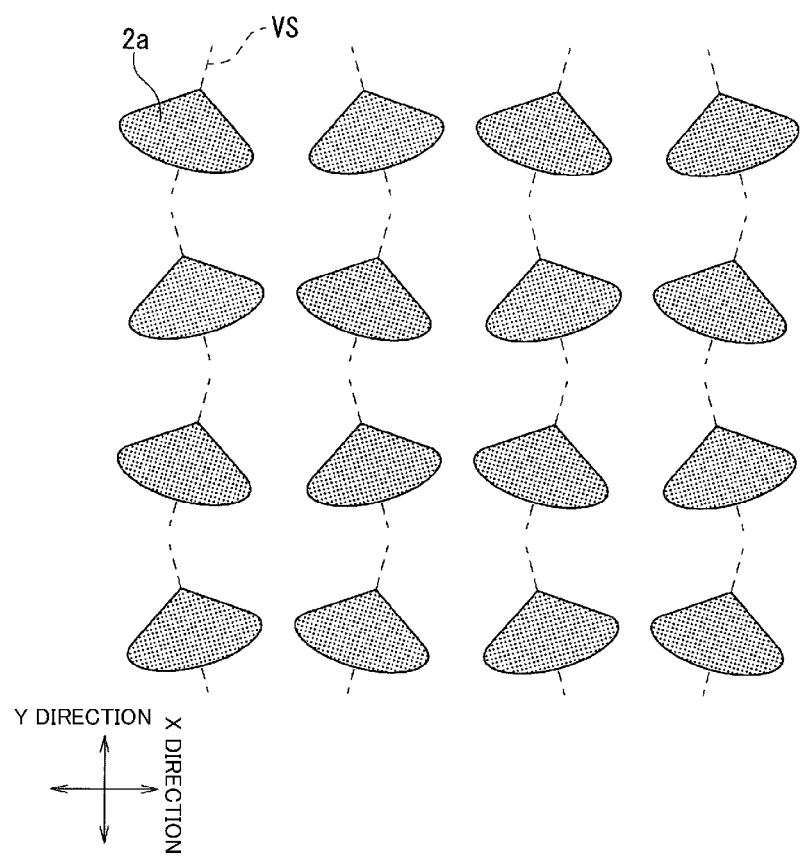
FIG. 20 is a diagram illustrating a pattern in which the shape of the deforming interface is changed.

The pattern that moves the mobile device 20 in the desired direction through a combination of a direction in which the heights of the deforming interfaces 2 are changed by the shape changing unit 5 and the tilt of the deformation axis VS by the tilt changing unit 6 is, for example, the pattern illustrated in FIG. 20. The pattern illustrated in FIG. 20 is a pattern in which, in a plurality of (four, in the drawing) deforming interfaces 2 arranged in the X direction and forming a single row, the deformation axes VS are tilted in different directions in each of adjacent rows in the Y direction, and the heights of the deforming interfaces 2 are changed. In other words, with the pattern illustrated in FIG. 20, the plurality of deforming interfaces 2 are disposed so that the deformation axes VS are oriented in mutually-different directions.

Accordingly, the shape change control unit 4 controls the operations of a plurality of shape changing units 5 individually. Through this, the vertices are formed in such a manner that the positions of the vertices caused to protrude in the part of the plane where the plurality of deforming interfaces 2 are disposed move continuously while at least some of the deforming interfaces 2 contact the ground.

Additionally, the shape change control unit 4 controls the operations of the shape changing unit 5 so as to cause the deforming interface 2 to deform in a shape projecting in an arbitrary direction.

Figure 21:
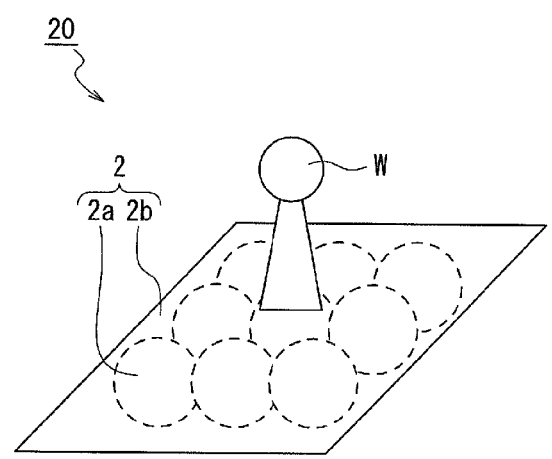
FIG. 21 is a diagram illustrating operations performed by the shape changing system, the electronic device, and the mobile device according to the fourth embodiment.

The mobile device 20 moves as illustrated in FIG. 21 when the vertices are formed in such a manner that the positions of the vertices formed by causing part of the plane formed including the plurality of deforming interfaces 2 to protrude move continuously while at least some of the plurality of deforming interfaces 2 contact the ground. Note that FIG. 21 schematically illustrates a state in which the plurality of deforming interfaces 2 are deformed to increase in height. FIG. 21 also illustrates the object to be transported W as being placed on the mobile device 20. In other words, the mobile device 20 illustrated in FIG. 21 forms a tray that moves the object to be transported W placed thereon.

According to the configuration of the fourth embodiment, changing the heights of the plurality of deforming interfaces 2 disposed in a pre-set plane makes it possible to cause the electronic device 1 itself to move so as to crawl along the surface along which the mobile device 20 is to move.

According to the configuration of the fourth embodiment, changing the heights of the plurality of deforming interfaces 2 disposed in a pre-set plane, and furthermore changing the tilts of the deformation axes VS, makes it possible to cause the electronic device 1 itself to move efficiently.

According to the configuration of the fourth embodiment, changing the shapes of the plurality of deforming interfaces 2 makes it possible to move over a step in the surface to be moved on when such a step is present.

According to the configuration of the fourth embodiment, using an air pump to change the shape of the deforming interface 2 makes it possible to reduce sound arising during movement.

Fifth Embodiment

Figure 22:
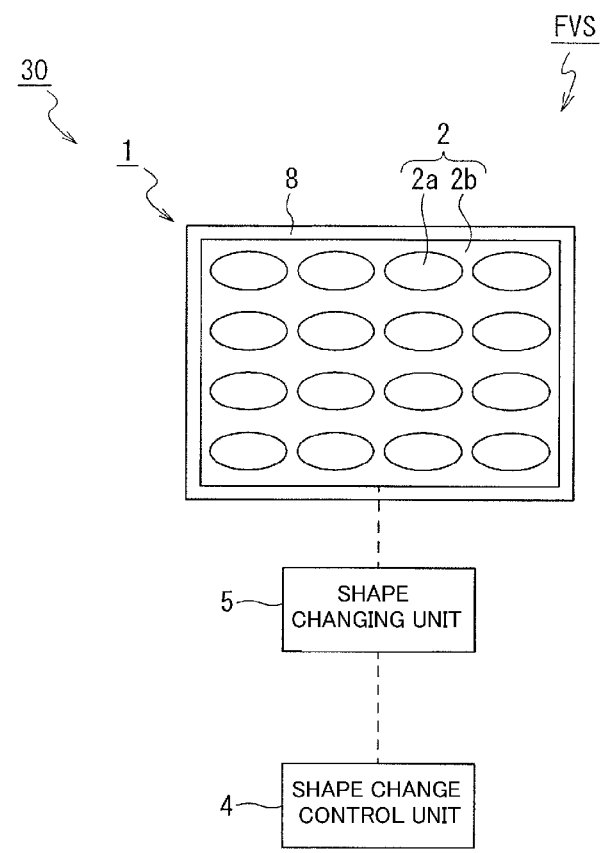
FIG. 22 is a diagram illustrating the configuration of a shape changing system, an electronic device, and a direction presenting device according to a fifth embodiment.

The electronic device 1 according to a fifth embodiment is incorporated into a direction presenting device 30 as illustrated in FIG. 22. Descriptions of parts identical to those in the first embodiment will be omitted from the following descriptions.

The direction presenting device 30 is a device that presents an arbitrary direction to a user.

As illustrated in FIG. 22, the electronic device 1 includes the plurality of deforming interfaces 2.

The electronic device 1, together with a shape change control unit 4, is included in a shape change system FVS. In other words, the shape change system FVS includes the electronic device 1 and the shape change control unit 4.

The plurality of deforming interfaces 2 are attached to a surface of a sheet-shaped mounting member 8.

The mounting member 8 is a sheet-shaped member having a surface to which the plurality of deforming interfaces 2 are attached (a surface that faces a user's body).

Figure 23:
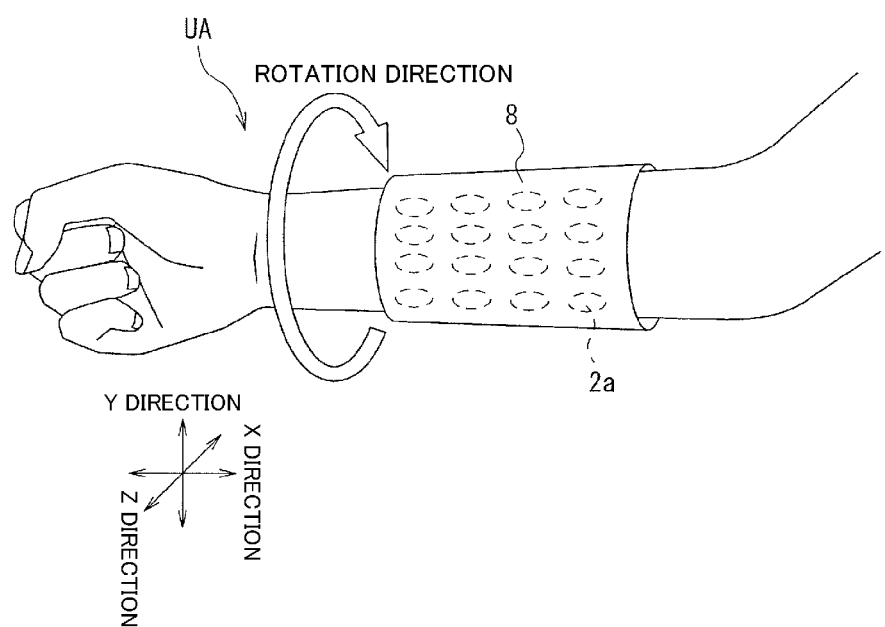
FIG. 23 is a diagram illustrating a mounting state of a mounting member.

The mounting member 8 encircles an arm UA of the user by mounting the mounting member 8 to the arm UA with the plurality of deforming interfaces 2 in contact with the arm UA, as illustrated in FIG. 23.

Accordingly, the plurality of deforming interfaces 2 encircle the user's arm UA while in contact with the arm UA.

The deforming interface 2 includes the shape changing unit 5 that causes a change in the state of only the deforming part 2a of the deforming interface 2.

The shape changing unit 5 is formed including, for example, an air pump, and causes the deforming part 2a to change shape using a fluid (a gas).

The shape change control unit 4 controls operations of the shape changing unit 5 in accordance with a pre-set pattern.

The pre-set pattern is a pattern that presents the user with directions in which the user's arm UA is to be moved, by setting the positions of the deforming interfaces 2, among the plurality of deforming interfaces in contact with the arm UA, for which the heights are to be changed by the shape changing unit 5. Note that the direction in which the user's arm UA is to be moved are, for example, the "X direction, Y direction, and Z direction" indicated in FIG. 23.

Additionally, the pre-set pattern is a pattern that presents the user with a direction in which the user's arm UA is to be rotated, by setting the order of the deforming interfaces 2, among the plurality of deforming interfaces in contact with the arm UA, for which the heights are to be changed by the shape changing unit 5. Note that the direction in which the user's arm UA is to be rotated is, for example, the "rotation direction" indicated in FIG. 23.

As described above, the shape change control unit 4 controls the operations of the shape changing unit 5 so as to present the user with a direction in which to move while the plurality of deforming interfaces 2 are in contact with the user. Additionally, the shape change control unit 4 controls the operations of the shape changing unit 5 so as to present the user with a direction in which to rotate while the plurality of deforming interfaces 2 are in contact with the user.

According to the configuration of the fifth embodiment, by controlling the plurality of deforming interfaces 2, which are arranged facing the periphery of the arm UA, to move in tandem, the user can be presented with a direction in which the arm UA is to be moved, such as the X direction, the Y direction, or the Z direction, a direction in which the arm UA is to be rotated, and so on.

Sixth Embodiment

Figure 24:
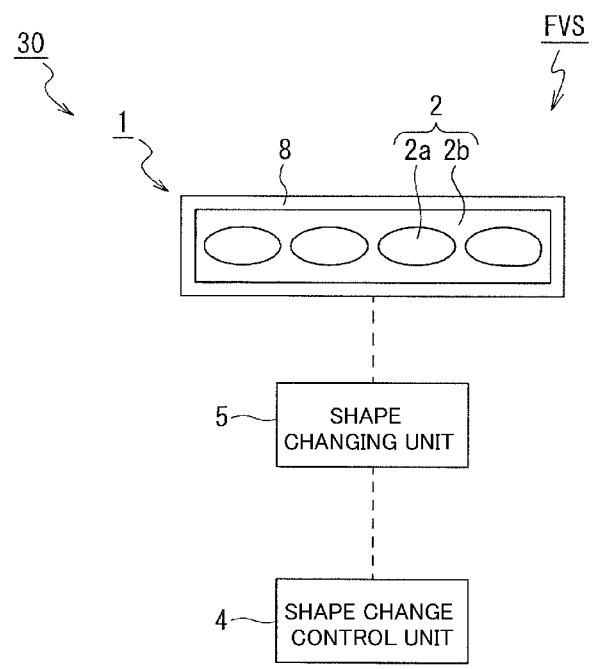
FIG. 24 is a diagram illustrating the configuration of a shape changing system, an electronic device, and a direction presenting device according to a sixth embodiment.

The electronic device 1 according to a sixth embodiment is incorporated into a direction presenting device 30 as illustrated in FIG. 24. Descriptions of parts identical to those in the first embodiment will be omitted from the following descriptions.

The direction presenting device 30 is a device that presents an arbitrary direction to a user.

As illustrated in FIG. 24, the electronic device 1 includes the plurality of deforming interfaces 2.

The electronic device 1, together with a shape change control unit 4, is included in a shape change system FVS. In other words, the shape change system FVS includes the electronic device 1 and the shape change control unit 4.

The plurality of deforming interfaces 2 are attached to a surface of a sheet-shaped mounting member 8.

The mounting member 8 is a sheet-shaped member having a surface to which a plurality of the deforming interfaces 2 arranged in a single row are attached (a surface that faces a user's body).

Figure 25:
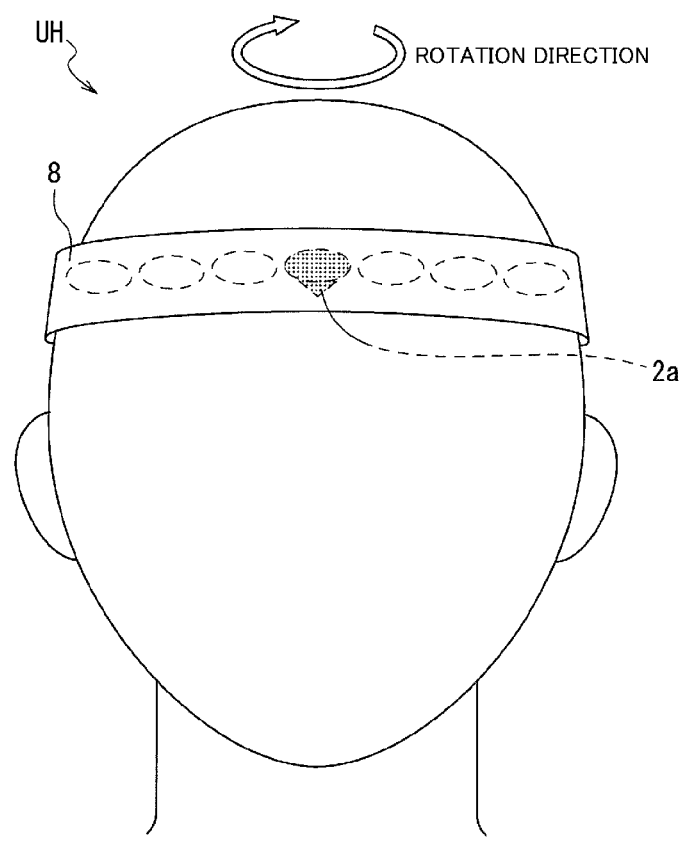
FIG. 25 is a diagram illustrating a mounting state of a mounting member.

The mounting member 8 encircles a head UH of the user from a side surface by mounting the mounting member 8 to the head UH with the plurality of deforming interfaces 2 in contact with the head UH, as illustrated in FIG. 25. Accordingly, the plurality of deforming interfaces 2 encircle the user's head UH from the side surface thereof while in contact with the head UH.

The deforming interface 2 includes the shape changing unit 5 that causes a change in the state of only the deforming part 2a of the deforming interface 2. The shape changing unit 5 is formed including, for example, an air pump, and causes the deforming part 2a to change shape using a fluid (a gas).

The shape change control unit 4 controls operations of the shape changing unit 5 in accordance with a pre-set pattern.

The pre-set pattern is a pattern that presents the user with directions in which the user's head UH is to be moved, by setting the positions of the deforming interfaces 2, among the plurality of deforming interfaces in contact with the head UH, for which the heights are to be changed by the shape changing unit 5. Note that the direction in which the user is to move the head UH is, for example, a direction intersecting with an axis centered on the head UH and extending in the up-down direction (a 360° direction).

Additionally, the pre-set pattern is a pattern that presents the user with directions in which the user's head UH is to be rotated, by setting the order of the deforming interfaces 2, among the plurality of deforming interfaces in contact with the head UH, for which the heights are to be changed by the shape changing unit 5. Note that the direction in which the user's head UH is to be rotated is, for example, the "rotation direction" indicated in FIG. 25.

As described above, the shape change control unit 4 controls the operations of the shape changing unit 5 so as to present the user with a direction in which to move while the plurality of deforming interfaces 2 are in contact with the user. Additionally, the shape change control unit 4 controls the operations of the shape changing unit 5 so as to present the user with a direction in which to rotate while the plurality of deforming interfaces 2 are in contact with the user. According to the configuration of the sixth embodiment, by controlling the plurality of deforming interfaces 2, which are arranged facing the periphery of the head UH, to move in tandem, the user can be presented with a direction in which the head UH is to be moved, such as the X direction, the Y direction, or the Z direction, a direction in which the head UH is to be rotated, and so on.

Variations on Sixth Embodiment

The sixth embodiment describes a configuration in which using the mounting member 8, the user's head is encircled by the plurality of deforming interfaces 2 from the side surface, and a direction in which the user is to move or rotate is presented in accordance with a pre-set pattern, but the configuration is not limited thereto. In other words, for example, the configuration may be such that a direction in which the user is to move or rotate is presented in accordance with an image displayed using an electronic device, such as a head-mounted display worn on the user's head or a display installed on a wall surface or the like.

The head-mounted display is formed by disposing a display that displays an image in part of goggles, a hat, or the like, and displays a visible image in one or both of the user's eyes. An image of a virtual space, an image captured by a camera, or the like, for example, can be used as an image to be displayed using the electronic device such as a head-mounted display. Additionally, the electronic device may be configured to be capable of outputting audio in addition to images.

In such a case, for example, a direction in which the user is to move or rotate in a real environment is presented in accordance with a situation in a virtual environment (virtual reality) output using images and audio.

Seventh Embodiment

Figure 26:
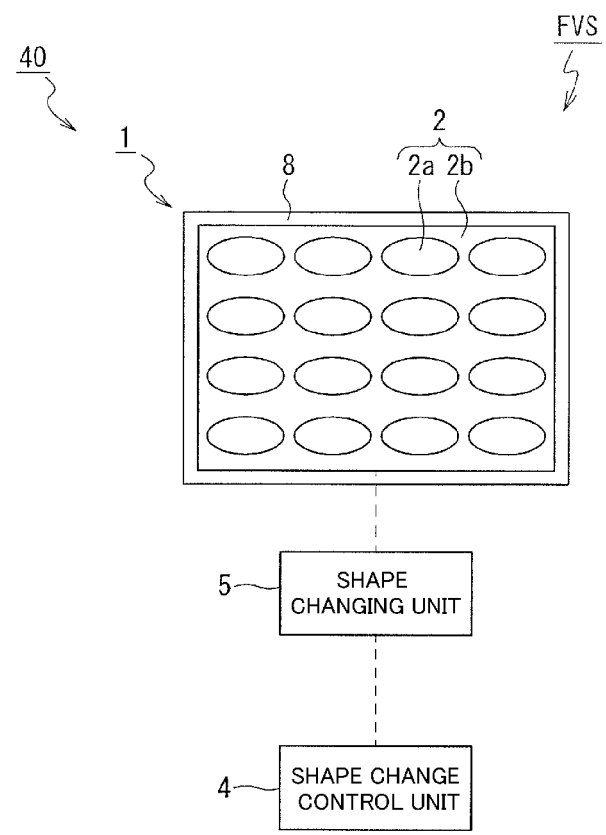
FIG. 26 is a diagram illustrating the configuration of a shape changing system, an electronic device, and a guidance device according to a seventh embodiment.

The electronic device 1 according to a seventh embodiment is incorporated into a guidance device 40 as illustrated in FIG. 26. Descriptions of parts identical to those in the first embodiment will be omitted from the following descriptions. The guidance device 40 is a device that prompts a user, to which the plurality of deforming interfaces 2 are attached, to perform a desired action.

As illustrated in FIG. 26, the electronic device 1 includes the plurality of deforming interfaces 2.

The electronic device 1, together with a shape change control unit 4, is included in a shape change system FVS. In other words, the shape change system FVS includes the electronic device 1 and the shape change control unit 4.

The plurality of deforming interfaces 2 are attached to a surface of a sheet-shaped mounting member 8.

The mounting member 8 is a sheet-shaped member having a surface to which the plurality of deforming interfaces 2 are attached (a surface that faces a user's body).

The mounting member 8 encircles the arm UA of the user by mounting the mounting member 8 to the arm UA with the plurality of deforming interfaces 2 in contact with the arm UA (see FIG. 23). In other words, the plurality of deforming interfaces 2 are attached to the user by encircling the user's arm UA.

The deforming interface 2 includes the shape changing unit 5 that causes a change in the state of only the deforming part 2a of the deforming interface 2. The shape changing unit 5 is formed including, for example, an air pump, and causes the deforming part 2a to change shape using a fluid (a gas).

The shape change control unit 4 controls operations of the shape changing unit 5 in accordance with a pre-set pattern.

The pre-set pattern is a pattern that presents the user with a sense of force on the arm of the head UH is to be moved, by setting the positions of the deforming interfaces 2, among the plurality of deforming interfaces in contact with the arm UA, for which the heights are to be changed by the shape changing unit 5.

Additionally, the pre-set pattern is a pattern that presents the user with a sense of force on the arm of the head UH is to be moved, by setting the order of the deforming interfaces 2, among the plurality of deforming interfaces in contact with the arm UA, for which the heights are to be changed by the shape changing unit 5.

As described above, the user to which the plurality of deforming interfaces 2 are attached is prompted to take a desired action by the shape change control unit 4 controlling the operations of the shape changing unit 5 to cause at least one of the plurality of deforming interfaces 2 to deform.

Additionally, the user can be prompted to take an action of moving the user's arm UA in an arbitrary direction by the shape change control unit 4 controlling the operations of the shape changing unit 5 to cause at least one of the plurality of deforming interfaces 2 to produce a sense of force in the arm UA.

According to the configuration of the seventh embodiment, by controlling the plurality of deforming interfaces 2, which are attached to the user by encircling the user's arm UA, in tandem, the user can be prompted to take an action of moving the arm UA in an arbitrary direction.

Variations on Seventh Embodiment

Although the seventh embodiment describes a configuration in which the plurality of deforming interfaces 2 are attached to the user by encircling the user's arm UA, the configuration is not limited thereto. In other words, the configuration may be such that the plurality of deforming interfaces 2 are attached to the user while facing the user's back.

In this case, the user can be prompted to take an action of moving in an arbitrary direction (a forward direction) by the shape change control unit 4 being configured to control the operations of the shape changing unit 5 to cause the plurality of deforming interfaces 2 to produce a sense of force in the user's back. According to this configuration, by controlling the plurality of deforming interfaces 2, which are attached to the user while facing the user's back, in tandem, the user can be prompted to take an action of moving in an arbitrary direction.

In this case, for example, the configuration may be such that the deforming interfaces 2 are disposed, as wearable devices, in a jacket or shirt that can be worn on the user's upper body, in a position facing the user's back.

In addition to wearable devices, by applying this embodiment to a configuration that uses an electronic device capable of outputting images and audio, the configuration may be such that, for example, the user is caused to move in an arbitrary direction in a real environment in accordance with conditions in a virtual environment output using images and audio.

Additionally, by applying this embodiment to a configuration in which the plurality of deforming interfaces 2 encircle the user's arm UA, the configuration may be such that a user in a real environment is prompted to take an action of moving the arm UA in an arbitrary direction in accordance with conditions in a virtual environment output using images and audio, for example.

Although the seventh embodiment describes a configuration in which the plurality of deforming interfaces 2 are attached to the user by encircling the user's arm UA, the configuration is not limited thereto. In other words, the configuration may be such that the plurality of deforming interfaces 2 are attached to the user while facing the back of the user's right knee and the back of the user's left knee.

In this case, the user can be prompted to take an action of walking in an arbitrary direction (a forward direction, a rearward direction) by the shape change control unit 4 being configured to control the operations of the shape changing unit 5 to cause the deforming interfaces 2 to deform and press on the back of the right knee and the back of the left knee in an alternating manner. According to this configuration, by controlling the plurality of deforming interfaces 2, which are attached to the user while facing the back of the user's right knee and the back of the user's left knee, in tandem, the user can be prompted to take an action of walking in an arbitrary direction.

In this case, for example, the configuration may be such that the deforming interfaces 2 are disposed, as wearable devices, in tights or the like that can be worn on the user's lower body, in positions facing the back of the user's right knee and the back of the user's left knee.

In addition to wearable devices, by applying this embodiment to a configuration that uses an electronic device capable of outputting images and audio, the configuration may be such that, for example, the user is prompted to take an action of walking in an arbitrary direction in a real environment in accordance with conditions in a virtual environment output using images and audio.

Eighth Embodiment

Figure 27:
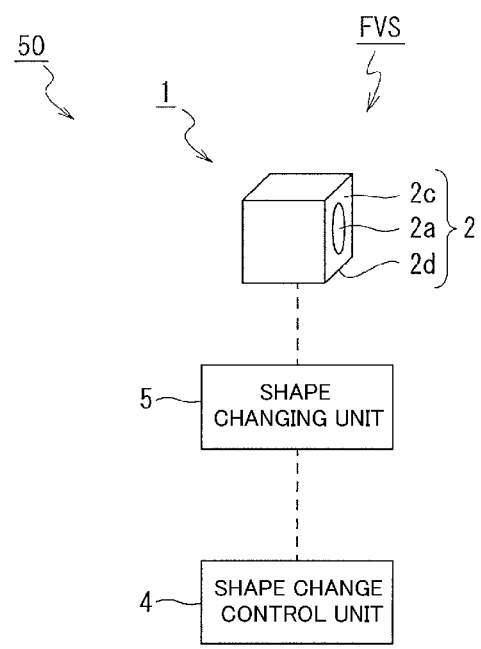
FIG. 27 is a diagram illustrating the configuration of a shape changing system, an electronic device, and a direction display device according to an eighth embodiment.

The electronic device 1 according to an eighth embodiment is incorporated into a direction display device 50 as illustrated in FIG. 27. Descriptions of parts identical to those in the first embodiment will be omitted from the following descriptions.

The direction display device 50 is a device that displays an arbitrary direction and amount to the user. Note that the arbitrary direction is, for example, a direction that guides the user to a destination indoors. The desired amount is, for example, an amount of movement required for the user to reach the destination indoors.

The electronic device 1 includes the deforming interface 2.

The electronic device 1, together with a shape change control unit 4, is included in a shape change system FVS. In other words, the shape change system FVS includes the electronic device 1 and the shape change control unit 4.

The eighth embodiment will describe a case where the shape of the deforming interface 2 is a shape having a frame part 2d, the deforming part 2a, and a connecting part 2c.

The frame part 2d is formed using a plurality of rod-shaped members that form a cube.

The deforming part 2a is formed in a circular shape, and is disposed in the center of two surfaces, of the six surfaces formed by the frame part 2d, which are opposite from each other with the center of the deforming interface 2 located therebetween. Note that only one of the deforming parts 2a disposed on the two surfaces is illustrated in the drawing.

The connecting part 2c is formed between the frame part 2d and the deforming parts 2a, and connects the frame part 2d and the deforming parts 2a.

The deforming interface 2 includes a shape changing unit 5 that causes a change in the state of the deforming part 2a and the connecting part 2c of the deforming interface 2.

The shape changing unit 5 is formed including, for example, an air pump, and causes the deforming part 2a and the connecting part 2c to change shape using a fluid (a gas).

The shape change control unit 4 controls operations of the shape changing unit 5 in accordance with a pre-set pattern.

The pre-set pattern is a pattern in which, for example, the shape of the deforming interface 2 is caused to change to a shape that indicates the direction of a destination set in a building where the direction display device 50 is disposed. In this case, the shape change control unit 4 causes the shape of the deforming interface 2 to change, for example, when the user approaches the deforming interface 2 and the distance between the deforming interface 2 and the user has dropped below a pre-set distance.

Figure 28:
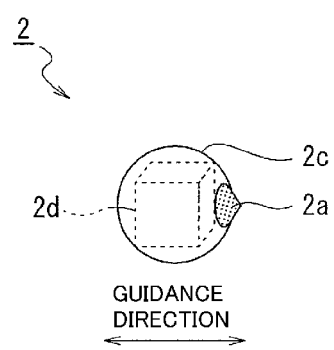
FIG. 28 is a diagram illustrating operations performed by the shape changing system, the electronic device, and the direction display device according to the eighth embodiment.

A direction in which the shape changing unit 5 changes the height of the deforming interface 2 is, for example, a direction following a direction guiding the user (a guidance direction), as illustrated in FIG. 28.

Additionally, an amount by which the shape changing unit 5 changes the height of the deforming interface 2 is an amount based on the position of the deforming interface 2 and the distance to the destination set in the building in which the direction display device 50 is disposed.

Note that as illustrated in FIG. 28, the shape change control unit 4 causes the entire connecting part 2c to deform into a spherical shape, and causes the deforming part 2a to deform into a cone shape.

According to the configuration of the eighth embodiment, by changing the shape of the deforming interface 2 visible to the user, a movement path from the user's current location to a destination can be presented to the user.

Other Embodiments

Although embodiments of the present technique have been provided thus far, it is to be understood that the descriptions and drawings constituting this disclosure are not intended to limit the present technique. Various alternative embodiments, working examples, and operational techniques should be clear to a person skilled in the art based on this disclosure.

Of course, the present technique furthermore includes a variety of embodiments not described here, such as configurations achieved by applying the configurations described in the foregoing embodiments as desired. Accordingly, the technical scope of the present technique is to be defined only by the invention-defining matters according to the scope of claims pursuant to the above descriptions.

The electronic device and shape changing system according to the present disclosure do not absolutely have to include all the constituent elements described in the foregoing embodiments and the like, and conversely may include other constituent elements as well.

Note also that the effects described in the present specification are merely examples, and are not intended to be limiting; other effects may be provided as well.

The present technique can take on the following configurations.

(1)

An electronic device including: a plurality of deforming interfaces, each including a shape changing unit that causes a shape of the deforming interface to change, wherein,
    by controlling operations of the shape changing units to cause the shapes of the deforming interfaces to change, the electronic device is capable of forming a vertex formed by causing a part of a surface formed including the plurality of deforming interfaces to protrude in any desired position of the surface.

(2)

The electronic device according to (1), wherein the vertex is formed so that a position of the vertex moves continuously.

(3)

The electronic device according to (1) or (2), wherein the deforming interface is caused to deform along a deformation axis that is a single axis.

(4)

The electronic device according to (3), including a tilt changing unit that changes a tilt of the deformation axis relative to the surface.

(5)

The electronic device according to (3) or (4), wherein the plurality of deforming interfaces are disposed so that the deformation axes face in mutually-different directions, and
    operations of the shape changing units are controlled in such a manner that the deforming interfaces deform in a shape projecting in an arbitrary direction.

(6)

The electronic device according to (5), including a tilt changing unit that changes a tilt of the deformation axis relative to the surface.

(7)

The electronic device according to any one of (1) to (6), wherein a state of the deforming interfaces is changed by a fluid.

(8)

The electronic device according to any one of (1) to (7), wherein the plurality of deforming interfaces are housed within a single case part that is changeable in shape by receiving an external force.

(9)

The electronic device according to any one of (1) to (8), including an external force sensor that detects an external force acting on the deforming interfaces, wherein
    the plurality of deforming interfaces are disposed in a grid, and
    by individually controlling operations of a plurality of the shape changing units, vertices are formed in such a manner that the position of the vertex moves continuously starting from a deforming interface, among the plurality of deforming interfaces, in which the external force sensor detects the external force.

(10)
The electronic device according to any one of (1) to (9), wherein by individually controlling operations of a plurality of the shape changing units, vertices are formed in such a manner that the position of the vertex moves continuously in a state where at least some of the plurality of deforming interfaces are in contact with the ground.

(11)
The electronic device according to any one of (1) to (10), wherein operations of the shape changing units are controlled in such a manner that a user is presented with an arbitrary direction in a state where the plurality of deforming interfaces are in contact with the user.

(12)
The electronic device according to any one of (1) to (11), wherein operations of the shape changing units are controlled in such a manner that a user is presented with a direction prompting the user to move in a state where the plurality of deforming interfaces are in contact with the user.

(13)
The electronic device according to any one of (1) to (12), wherein operations of the shape changing units are controlled in such a manner that a user is presented with a direction prompting the user to rotate in a state where the plurality of deforming interfaces are in contact with the user.

(14)
The electronic device according to any one of (1) to (13), wherein the plurality of deforming interfaces encircle an arm of a user while in contact with the arm.

(15)
The electronic device according to any one of (1) to (14), wherein the plurality of deforming interfaces encircle a head of a user from a side surface while in contact with the head.

(16)
The electronic device according to any one of (1) to (15), wherein the plurality of deforming interfaces are attached to a user by encircling an arm of the user to which the plurality of deforming interfaces are attached, and
operations of the shape changing units are controlled to prompt the user to take an action of moving the arm of the user in an arbitrary direction by causing at least one of the plurality of deforming interfaces to deform so as to produce a sense of force on the arm.

(17)
The electronic device according to any one of (1) to (16), wherein the plurality of deforming interfaces are attached to a user while facing a back of the user to which the plurality of deforming interfaces are attached, and operations of the shape changing units are controlled to prompt the user to take an action of moving in an arbitrary direction by causing the deforming interfaces to deform so as to produce a sense of force on the back.

(18)
The electronic device according to any one of (1) to (17), wherein the plurality of deforming interfaces are attached to a user while facing a back of a right knee or the user and a back of a left knee of the user to which the plurality of deforming interfaces are attached, and
operations of the shape changing units are controlled to prompt the user to take an action of walking in an arbitrary direction by causing the deforming interfaces to deform so as to push on the back of the right knee and the back of the left knee in an alternating manner.

(19)
A shape changing system including: an electronic device including a plurality of deforming interfaces, each having a shape changing unit that causes a shape of the deforming interface to change; and
a shape change control unit that, by controlling operations of the shape changing units to cause the shapes of the deforming interfaces to change, is capable of forming a vertex, formed by causing a part of a surface formed including the plurality of deforming interfaces to protrude, in any desired position of the surface.

(20)
The shape changing system according to (19), wherein the shape change control unit forms vertices in such a manner that the position of the vertex moves continuously.

(21)
The shape changing system according to (19) or (20), wherein the shape change control unit causes the deforming interface to deform along a deformation axis that is a single axis.

(22)
The shape changing system according to any one of (19) to (21), wherein the plurality of deforming interfaces are disposed so that the deformation axes face in mutually-different directions, and
the shape change control unit controls operations of the shape changing units in such a manner that the deforming interfaces deform in a shape projecting in an arbitrary direction.

(23)
The shape changing system according to any one of (19) to (22), wherein the shape change control unit changes a state of the deforming interfaces by a fluid.

(24)
The shape changing system according to any one of (19) to (23), including an external force sensor that detects an external force acting on the deforming interfaces, wherein
the plurality of deforming interfaces are disposed in a grid, and
by individually controlling operations of a plurality of the shape changing units, the shape change control unit forms vertices in such a manner that the position of the vertex moves continuously starting from a deforming interface, among the plurality of deforming interfaces, in which the external force sensor detects the external force.

(25)
The shape changing system according to any one of (19) to (24), wherein by individually controlling operations of a plurality of the shape changing units, the shape change control unit forms vertices in such a manner that the position of the vertex moves continuously in a state where at least some of the plurality of deforming interfaces are in contact with the ground.

(26)
The shape changing system according to any one of (19) to (25), wherein the shape change control unit controls operations of the shape changing units in such a manner that a user is presented with an arbitrary direction in a state where the plurality of deforming interfaces are in contact with the user.

(27)
The shape changing system according to any one of (19) to (26), wherein the shape change control unit controls operations of the shape changing units in such a manner that a user is presented with a direction prompting the user to move in a state where the plurality of deforming interfaces are in contact with the user.

(28)

The shape changing system according to any one of (19) to (27), wherein the shape change control unit controls operations of the shape changing units in such a manner that a user is presented with a direction prompting the user to rotate in a state where the plurality of deforming interfaces are in contact with the user.

(29)

The shape changing system according to any one of (19) to (28), wherein the plurality of deforming interfaces are attached to a user by encircling an arm of the user to which the plurality of deforming interfaces are attached, and the shape change control unit controls operations of the shape changing units to prompt the user to take an action of moving the arm of the user in an arbitrary direction by causing at least one of the plurality of deforming interfaces to deform so as to produce a sense of force on the arm.

(30)

The shape changing system according to any one of (19) to (29), wherein the plurality of deforming interfaces are attached to a user while facing a back of the user to which the plurality of deforming interfaces are attached, and the shape change control unit controls operations of the shape changing units to prompt the user to take an action of moving in an arbitrary direction by causing the deforming interfaces to deform so as to produce a sense of force on the back.

(31)

The shape changing system according to any one of (19) to (30), wherein the plurality of deforming interfaces are attached to a user while facing a back of a right knee or the user and a back of a left knee of the user to which the plurality of deforming interfaces are attached, and the shape change control unit controls operations of the shape changing units to prompt the user to take an action of walking in an arbitrary direction by causing the deforming interfaces to deform so as to push on the back of the right knee and the back of the left knee in an alternating manner.

REFERENCE SIGNS LIST

1 Electronic device
2 Deforming interface
2a Deforming part
2b Flat part
2c Connecting part
2d Frame part
3 External force sensor
4 Shape change control unit
5 Shape changing unit
6 Tilt changing unit
7 Case part
8 Mounting member
10 Transport device
20 Mobile device
30 Direction presenting device
40 Guidance device
50 Direction display device
FVS Shape change system
AP Air pump
CH Channel
SUB Substrate
W Object to be transported
UA User's arm
UH User's head

The invention claimed is:

1. An electronic device, comprising:
a plurality of deforming interfaces on a surface of the electronic device, wherein
each deforming interface of the plurality of deforming interfaces includes a shape changing unit configured to change a shape of a corresponding deforming interface of the plurality of deforming interfaces, and
the shape of the corresponding deforming interface is deformable along a deformation axis;
a force sensor configured to detect an external force on the corresponding deforming interface; and
a tilt changing unit configured to change, based on the detected external force on the corresponding deforming interface, a tilt of the deformation axis relative to the surface of the electronic device,
wherein the electronic device is configured to form, based on the change in the shape of the corresponding deforming interface, a vertex at a position on the surface by protrusion of a part of the surface.

2. The electronic device according to claim 1, wherein the formation of the vertex is such that the position of the vertex moves continuously.

3. The electronic device according to claim 1, wherein deformation axes of the plurality of deforming interfaces face in mutually-different directions, and
the plurality of deforming interfaces is deformable in a shape projecting in an arbitrary direction.

4. The electronic device according to claim 1, wherein the shape changing unit is further configured to change a state of the corresponding deforming interface by a fluid.

5. The electronic device according to claim 1, further comprising a single case part that includes the plurality of deforming interfaces,
wherein a shape of the single case part is changeable based on the external force.

6. The electronic device according to claim 1, wherein
the plurality of deforming interfaces is in a grid,
the electronic device is further configured to form, based on the change in the shape of the corresponding deforming interface, vertices on the surface such that positions of the vertices move continuously starting from the corresponding deforming interface in which the force sensor detects the external force, and
the vertices include the vertex.

7. The electronic device according to claim 1, wherein the electronic device is further configured to form, based on the change in the shape of the corresponding deforming interface, vertices on the surface such that positions of the vertices move continuously in a state where a set of deforming interfaces of the plurality of deforming interfaces is in contact with the ground.

8. The electronic device according to claim 1, wherein the shape changing unit is further configured to change the shape of the corresponding deforming interface, such that a user is presented with an arbitrary direction in a state where the plurality of deforming interfaces is in contact with the user.

9. The electronic device according to claim 1, wherein the shape changing unit is further configured to change the shape of the corresponding deforming interface, such that a user is presented with a direction prompting the user to move in a state where the plurality of deforming interfaces is in contact with the user.

10. The electronic device according to claim 1, wherein the shape changing unit is further configured to change the shape of the corresponding deforming interface, such that a user is presented with a direction prompting the user to rotate in a state where the plurality of deforming interfaces is in contact with the user.

11. The electronic device according to claim 1, wherein the plurality of deforming interfaces encircles an arm of a user in a case where the plurality of deforming interfaces is in contact with the arm.

12. The electronic device according to claim 1, wherein the plurality of deforming interfaces encircles a head of a user from a side surface of the head in a case where the plurality of deforming interfaces is in contact with the head.

13. The electronic device according to claim 1, wherein
the plurality of deforming interfaces is attachable to a user by encircling an arm of the user,
the shape changing unit is further configured to change the shape of the corresponding deforming interface to produce a sense of force on the arm, and
the sense of force on the arm prompts the user to take an action of moving the arm of the user in an arbitrary direction.

14. The electronic device according to claim 1, wherein
the plurality of deforming interfaces is attachable to a user while facing a back of the user,
the shape changing unit is further configured to change the shape of the corresponding deforming interface to produce a sense of force on the back, and
the sense of force on the back prompts the user to take an action of moving in an arbitrary direction.

15. The electronic device according to claim 1, wherein
the plurality of deforming interfaces is attachable to a user while facing a back of a right knee of the user and a back of a left knee of the user,
the shape changing unit is further configured to change the shape of the corresponding deforming interface so as to push on the back of the right knee and the back of the left knee in an alternating manner, and
the push on the back of the right knee and the back of the left knee prompts the user to take an action of walking in an arbitrary direction.

16. A shape changing system, comprising:
an electronic device including a plurality of deforming interfaces on a surface of the electronic device, wherein
each deforming interface of the plurality of deforming interfaces includes a shape changing unit configured to change a shape of a corresponding deforming interface of the plurality of deforming interfaces, and
the shape of the corresponding deforming interface is deformable along a deformation axis;
a force sensor configured to detect an external force on the corresponding deforming interface;
a tilt changing unit configured to change, based on the detected external force on the corresponding deforming interface, a tilt of the deformation axis relative to the surface of the electronic device; and
a shape change control unit configured to:
control the shape changing unit to change the shape of the corresponding deforming interface; and
control, based on the control of the shape changing unit, formation of a vertex at a position on the surface,
wherein the formation of the vertex is by protrusion of a part of the surface.

17. The shape changing system according to claim 16, wherein
the shape change control unit is further configured to control formation of vertices on the surface, such that positions of the vertices move continuously in a state where a set of deforming interfaces of the plurality of deforming interfaces is in contact with the ground, and
the vertices include the vertex.

* * * * *